UNITED STATES PATENT OFFICE.

WILHELM HICKMANN, OF FRANKFORT-ON-THE-MAIN, GERMANY, ASSIGNOR TO CHEMISCHE FABRIK GRIESHEIM-ELEKTRON, OF FRANKFORT-ON-THE-MAIN, GERMANY, A CORPORATION OF GERMANY.

GALVANIC BATTERY.

1,173,965.  Specification of Letters Patent.   Patented Feb. 29, 1916.

No Drawing.   Application filed May 10, 1911. Serial No. 626,217.

*To all whom it may concern:*

Be it known that I, WILHELM HICKMANN, a subject of the German Emperor, and resident of Frankfort-on-the-Main, Germany, have invented certain new and useful Improvements in Galvanic Batteries, of which the following is a specification.

This invention relates to improvements in galvanic batteries and more particularly in galvanic batteries of the Leclanché type.

One of the objects of the invention is to provide a galvanic cell in which an acid manganite acts as the depolarizer.

Other objects and the novel features of the invention will be apparent from the following description.

It is well known that the efficiency of the Leclanché cell or battery is greatly increased if hydrated peroxid of manganese, the formula of which is $H_2O.MnO_2$ or $H_2MnO_3$ or $MnO\genfrac{}{}{0pt}{}{OH}{OH}$ be used as a depolarizer. This is due, among other reasons, to the fact that the hydrate of manganese dioxid is readily capable of reduction and in consequence of its acid character it is adapted to combine with the bases resulting from the working of the cell so that premature precipitation of the same and the attendant disadvantages are checked as much as possible. For instance, if the formed base contains a metal such as Zn and all the H in $H_2MnO_3$ is replaced thereby a normal manganite, as $ZnO.MnO_2$ is obtained thus, $$H_2MnO_3 + Zn(OH)_2 = ZnMnO_3 + 2H_2O.$$

However, if only a part of the H in $H_2MnO_3$ is replaced by such a metal, an acid manganite, as for instance $$ZnO.4H_2O.5MnO_2 \text{ or } ZnH_8Mn_5O_{15}$$

is obtained. It has, however, been found that the hydrate of manganese dioxid also has injurious effects when acting as an acid. It enters into mutual reaction with the salts of the electrolyte up to a certain state of chemical equilibrium, taking up therethrough a part of the free base and liberating a corresponding amount of acid. When the hydrate of manganese dioxid enters into reaction with a salt of the electrolyte, only acid manganites are formed, for instance, according to the following formula:

$$10H_2MnO_3 + XZnCl_2 = ZnH_{18}Mn_{10}O_{30} + (X-1)ZnCl_2 + 2HCl$$

(X being any number above 10). So long as the acid is held back in the depolarizing mass it is harmless, but if, as in the case of dry cells or batteries which are kept inactive for a long time, it reaches by diffusion the metallic electrode the same is attacked and hydrogen evolved. The following reaction takes place:

$$Zn + 2HCl = ZnCl_2 + 2H.$$

This has a destructive effect on the life and efficiency of the cell and occurs in the same even before the cell has begun working and consequently the cell cannot be kept inactive save for a very short time. I have found that this disadvantage can be obviated if, instead of hydrate of manganese dioxid, an acid salt of the same, an acid manganite be used. I have found that these acid manganites are not capable of liberating acids from the salts used as an electrolyte, although they have the power of taking up bases formed in the working of the cell and preventing their separation, which is advantageous for the efficiency of the cell or battery. If, for instance, the acid manganite $ZnH_8Mn_5O_{15}$ is used it is no longer able to liberate hydrochloric acid from $ZnCl_2$ but is not yet fully saturated with base, for which reason it is afterward, when the cells are in use, able to unite with other bases formed, such as $Zn(OH)_2$ or $(NH_4)_2O$ according to the following reaction:

$$ZnH_8Mn_5O_{15} + 4Zn(OH)_2 = 5ZnMnO_3 + 8H_2O.$$

Such acid manganites can be obtained in various ways, for instance they are obtainable by treating rich basic manganites such as Weldon mud with dilute acids whereby a portion of the base is removed, or they may be obtained by treating hydrate of manganese dioxid with salts or bases.

Hydrate of manganese dioxid takes up a slight amount of base in neutral saline solutions, but the partial saturation is sufficient to prevent a subsequent release of the acid from the electrolyte. In basic solutions, such as ammonia or ammoniacal zinc chlorid solutions, it unites with a considerable amount of base and for this reason it is not advisable to use bases beyond the amount required in order that the manganite formed shall be able to unite with the further amount of bases formed during the working of the cell. It is preferable, for the purpose of partially neutralizing the acidity of the hydrate of manganese dioxid, to select salts, or bases, of metals which are also present in the component parts of the cell, or battery, for instance, $NH_4$ and $Zn$ in the electrolyte and electrode. This has the advantage, among others, that in the regeneration of the depolarizing mass, no foreign disturbing bodies are present. If no regeneration be contemplated, acid manganites may be used which contain other bases, provided they do not give rise to an undesirable mutual reaction with the electrolyte.

I claim herein as my invention:

1. In a galvanic cell or battery of the Leclanché type, a depolarizer containing a manganite.

2. A depolarizer, for use in combination with the cathode in a Leclanché cell, comprising an acid manganite.

3. A depolarizer for use in combination with the cathode in a Leclanché cell comprising an acid manganite, a portion of the hydrogen of which has been replaced by an element present in a component part of the cell.

4. In a galvanic cell comprising positive and negative elements, a depolarizing mass containing a manganite.

5. A depolarizer for use in combination with the cathode in a Leclanché cell containing an acid manganite adapted to unite with bases formed in the operation of the battery but unable to liberate acid from the salts of the electrolyte.

6. A depolarizing mass for use with an electrode of a galvanic cell, said depolarizing mass containing an acid manganite.

In testimony whereof I have signed my name to this specification in the presence of two subscribing witnesses.

WILHELM HICKMANN.

Witnesses:
 FRANZ HASSLACHER,
 MICHAEL VOLKE.